US012696063B2

(12) United States Patent
Mourad

(10) Patent No.: US 12,696,063 B2
(45) Date of Patent: Jul. 28, 2026

(54) CONTROL UNIT, VEHICLE COMPRISING THE CONTROL UNIT, METHOD AND COMPUTER PROGRAM

(71) Applicant: Bayerische Motoren Werke Aktiengesellschaft, Munich (DE)

(72) Inventor: Alaa Mourad, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 351 days.

(21) Appl. No.: 18/553,992

(22) PCT Filed: Feb. 7, 2022

(86) PCT No.: PCT/EP2022/052917
§ 371 (c)(1),
(2) Date: Oct. 4, 2023

(87) PCT Pub. No.: WO2022/233464
PCT Pub. Date: Nov. 10, 2022

(65) Prior Publication Data
US 2024/0196179 A1 Jun. 13, 2024

(30) Foreign Application Priority Data

May 4, 2021 (EP) ..................................... 21172039

(51) Int. Cl.
*H04W 4/80* (2018.01)
*H04W 4/48* (2018.01)
(52) U.S. Cl.
CPC ................ *H04W 4/80* (2018.02); *H04W 4/48* (2018.02)

(58) Field of Classification Search
CPC .................................. H04W 4/80; H04W 4/48
See application file for complete search history.

(56) References Cited

U.S. PATENT DOCUMENTS 10,084,778 B2 * 9/2018 Alexandru .......... H04L 61/5092
2017/0093856 A1 3/2017 Alexandru et al.
(Continued)

FOREIGN PATENT DOCUMENTS

EP 3796684 A1 3/2021
WO 2017207644 A1 12/2017

OTHER PUBLICATIONS

International Search Report corresponding to International Patent Application No. PCT/EP2022/052917, dated Jun. 9, 2022 (3 pages).
(Continued)

*Primary Examiner* — Tuan H Nguyen
(74) *Attorney, Agent, or Firm* — Maginot, Moore & Beck LLP

(57) ABSTRACT

A control unit for controlling connection establishment between a transmitter and a plurality of receivers includes an interface and processing circuitry. The interface is configured to communicate with a plurality of receivers. The processing circuitry is configured to control the interface and generate identification information for establishing a connection between a transmitter and a receiver of the plurality of receivers. The processing circuitry is further configured to transmit the identification information to the plurality of receivers, the identification information configured to enable the plurality of receivers to reuse the identification information for connecting to the transmitter.

18 Claims, 2 Drawing Sheets

(56)  References Cited

U.S. PATENT DOCUMENTS

2018/0198752  A1      7/2018   Zhang et al.
2021/0078535  A1      3/2021   Salah et al.

OTHER PUBLICATIONS

Extended European Search Report corresponding to European Patent Application No. EP21172039.6, dated Oct. 28, 2021 (10 pages).

* cited by examiner

200 —

Generating identification information for establishing a connection between a transmitter and a receiver of the plurality of receivers  ⌐∼210

Transmitting the identification information to the plurality of receivers to enable the plurality of receivers to reuse the same identification information for connecting to the transmitter  ⌐∼220

CONTROL UNIT, VEHICLE COMPRISING THE CONTROL UNIT, METHOD AND COMPUTER PROGRAM

The present application is the U.S. national phase of PCT Application PCT/EP2022/052917 filed on Feb. 7, 2022, which claims priority of European patent application No. 21172039.6 filed on May 4, 2021, which is incorporated herein by reference in its entirety.

FIELD

The present disclosure relates to the field of wireless communication. Embodiments relate to a control unit, a vehicle, a method and a computer program, more particularly, but not exclusively, to a concept for reducing a signaling overhead for pairing between transmitters and receivers in short range wireless communication.

BACKGROUND

The usage of Bluetooth low energy (BLE) has been dramatically increased in the resent years. In the automotive domain, BLE is quite promising for different applications (e.g. keyless vehicle access). The main purpose of using BLE is a fast discovery, which may require a large coverage area. Therefore, multiple BLE chips might be mounted in different location in a vehicle in order to provide sufficient coverage around the vehicle. The establishment of connections, e.g. with a user device, for the multiple BLE chips might be time and/or resource consuming. Thus, there may be a need for an improved concept or connection establishment.

In the state of the art, if multiple BLE chips are used to cover a contiguous area each BLE chip requires pairing with a user device. For example, multiple BLE chips may form a coverage area around a vehicle, and each BLE chip needs to be paired with a user device, e.g. a smart device for keyless vehicle access, to establish a connection with the user device. There are multiple ways to do the pairing according to Bluetooth specification. However, each of these multiple chips shall be paired with the user device, which is time consuming and not attractive for the end customer.

SUMMARY

It is therefore a finding that connection establishment information can be communicated to multiple transceivers for reuse. Connection establishment or pairing procedures can then be reduced or even avoided. For example, identification information for establishing a connection may be generated and communicated to a plurality of receivers to enable reuse of said information. That way, connection establishment or pairing procedures may suffice at least for the part that relates to communicating the identification information if said information has been communicated with one of the plurality of receivers.

Embodiments provide a control unit for controlling connection establishment between a transmitter and a plurality of receivers. The control unit comprises an interface, which is configured to communicate with a plurality of receivers. The control unit further comprises processing circuitry, which is configured to control the interface and to generate identification information for establishing a connection between a transmitter and a receiver of the plurality of receivers. The processing circuitry is further configured to transmit the identification information to the plurality of receivers, to enable the plurality of receivers to reuse the same identification information for connecting to the transmitter.

Embodiments further provide a method for controlling connection establishment between a transmitter and a plurality of receivers. The method comprises generating identification information for establishing a connection between a transmitter and a receiver of the plurality of receivers. The method further comprises transmitting the identification information to the plurality of receivers to enable the plurality of receivers to reuse the same identification information for connecting to the transmitter.

BRIEF DESCRIPTION OF THE DRAWINGS

Some examples of apparatuses and/or methods will be described in the following by way of example only, and with reference to the accompanying figures, in which.

DETAILED DESCRIPTION

Figure 1:
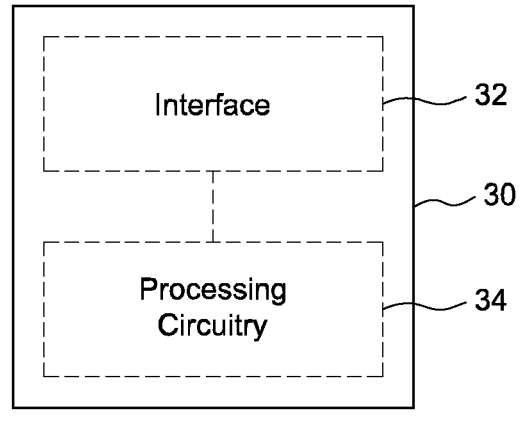
FIG. 1 shows a block diagram of an example of a control unit.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 shows a block diagram of an example of a control unit 30. The control unit 30 comprises an interface 32 configured to communicate with a plurality of receivers. Further, the control unit 30 comprises a processing circuitry 34, which is coupled to the interface 32, and which is configured to control the interface 32 and to generate identification information for establishing a connection between a transmitter and a receiver of the plurality of receivers. Further, the processing circuitry 34 is configured to transmit the identification information to the plurality of receivers, to enable the plurality of receivers to reuse the same identification information for connecting to the transmitter.

By reusing the same identification information for connecting to the transmitter connection establishment between any other of the plurality of receivers and the transmitter may be eased. So, a time and/or resource consumption of connection establishment processes between the transmitter and the plurality of receivers may be reduced and/or a user experience may be improved.

The identification information may be used to (initiate) establish a connection between a first receiver of the plurality of receivers and the transmitter. For example, the identification information may be used to establish an initial linkage between the first receiver and the transmitter. After the initial linkage has been performed, the identification information may be reused to (re)connect the first receiver and the transmitter without the need for another initial linkage. As well, the identification information may be reused for each receiver of the plurality of receivers, such that only one initial linkage may be required to connect each receiver of the plurality of receivers to the transmitter. For example, the plurality of receivers, e.g. multiple BLE chips, may be connected to the transmitter, e.g. an electronic device, by establishing only one initial linkage between the first receiver of the plurality of receivers and the transmitter, e.g. by a pairing process.

In an example the processing circuitry may be further configured to receive connection information from a first receiver of the plurality of receivers using the interface. The connection information may comprise data about an established connection between the first receiver and the transmitter. Further, the processing circuitry 34 may be configured to transmit the connection information to a second receiver of the plurality of receivers using the interface 32. The connection information is used to connect the transmitter with the second receiver of the plurality of receivers. Thus, both receivers can be connected to/paired with the transmitter by performing only one initial connection (establishment) process.

For example, the first receiver and the transmitter may perform a connection process with an initial linkage. Connection information about this initial linkage may be generated by the first receiver and may be transmitted to a second receiver of the plurality of receivers. By using the same identification information at the first receiver and the second receiver, the initial linkage between the second receiver and the transmitter may be omitted and the generated connection information of the first receiver is reused at the second receiver. For example, the connection information provided by the first receiver may be sufficient to establish a connection between the second receiver and the transmitter without further initial linkage.

For example, the identification information may be required to perform a connection process, e.g. a pairing process. The connection process may establish an initial linkage between the first receiver and the transmitter to allow communications between them. The connection process may be used to establish a wireless connection, e.g. Bluetooth connection and/or WiFi connection. By providing information about the connection process of the first receiver with the transmitter to a second receiver and assigning the same identification information to both receivers, the connection process (repetition) may be omitted for the second receiver. So, the second receiver may establish a connection to the transmitter without a further connection establishment process.

The plurality of receivers (e.g. multiple BLE Chips) may be used for certain functions. For example, a vehicle may have multiple BLE chips that are used for certain functions (e.g., keyless vehicle access). Thus, a connection, e.g. pairing, of each BLE chip with the transmitter, e.g. a smart device, is no longer required. For example, only the first receiver of the plurality of receivers may be connected, e.g. paired, with the transmitter, e.g. a first BLE chip of the vehicle may be connected, e.g. paired, with a smart device. After that (pairing process) data may be used to establish a connection between the transmitter and the second receiver of the plurality of receivers. For example, connection data, e.g. pairing data, may be transmitted to the second receiver enabling the second receiver to establish a connection with the transmitter without a further connection process, e.g. pairing.

In an example, the identification information comprises a private identity address and/or an identity resolving key. For example, the private identity address and/or the identity resolving key may be required to establish an initial linkage between the first receiver and the transmitter, e.g. for a Bluetooth pairing process. During the (Bluetooth) connection process connection information may be generated by the first receiver. The connection information may be specific for the private identity address and/or the identity resolving key and can only be used in combination with them. The paring information may be used by the first receiver to reconnect to the transmitter if a connection was lost, e.g. because the transmitter was outside a first receiver's sub-coverage area. This may allow the transmitter to reconnect to the first receiver based on the connection information without a need for a new initial linkage.

By assigning the same private identity address and/or the same identity resolving key to a second receiver, the connection information generated by the first receiver can also be used for establishing a connection between the second receiver and the transmitter. For example, the connection information may be transmitted from the first receiver to the second receiver and/or may be transmitted from the first receiver to the control unit 30 and from the control unit 30 to the second receiver. The second receiver can be connected to the transmitter using the connection information without the need for initial linkage. Thus, only one connection process may be required to connect both receivers to the transmitter, leading to a reduced time and/or resource consumption and an improved user experience.

Alternatively, the connection information may be generated by the transmitter. For example, the connection information generated during the initial linkage with the first receiver may be used for establishing a connection between the transmitter and the second receiver. For example, the transmitter may transmit the connection information to the second receiver, enabling a connection without a further initial linkage between the transmitter and the second transmitter. Thus, a further initial linkage may be omitted using the connection information generated by the transmitter.

In an example the processing circuitry 34 is further configured to generate the identification information for a Bluetooth Low Energy, BLE, receiver. For example, the identification information may comprise only the private identity address and the identity resolving key for both BLE receivers, which enables connection between both BLE receivers and the transmitter with only one connection process.

As shown in FIG. 1 the respective one or more interfaces 32 are coupled to the respective processing circuitry 34 at the control module 30. In embodiments the processing circuitry 34 may be implemented using one or more processing units, one or more processing devices, any means for processing, such as a processor, a computer or a programmable hardware component being operable with accordingly adapted software. Similar, the described functions of the processing circuitry 34 may as well be implemented in software, which is then executed on one or more programmable hardware components. Such hardware components may comprise a general-purpose processor, a Digital Signal Processor (DSP), a micro-controller, etc. The processing circuitry 34 is capable of controlling the interface 32, so that any data transfer that occurs over the interface and/or any interaction in which the interface may be involved may be controlled by the processing circuitry 34.

In an embodiment the control unit 30 may comprise a memory and at least one processor 34 operably coupled to the memory and configured to perform the below mentioned method.

In embodiments the one or more interfaces 32 may correspond to any means for obtaining, receiving, transmitting or providing analog or digital signals or information, e.g. any connector, contact, pin, register, input port, output port, conductor, lane, etc. which allows providing or obtaining a signal or information. An interface may be wireless or wireline and it may be configured to communicate, i.e. transmit or receive signals, information with further internal or external components. The one or more interfaces 32 may comprise further components to enable communication between vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly, adapted radio frequency components, etc.

More details and aspects are mentioned in connection with the embodiments described above or below. The example shown in FIG. 1 may comprise one or more optional additional features corresponding to one or more aspects mentioned in connection with the proposed concept or one or more examples described below (e.g. FIG. 2-3).

Figure 2:
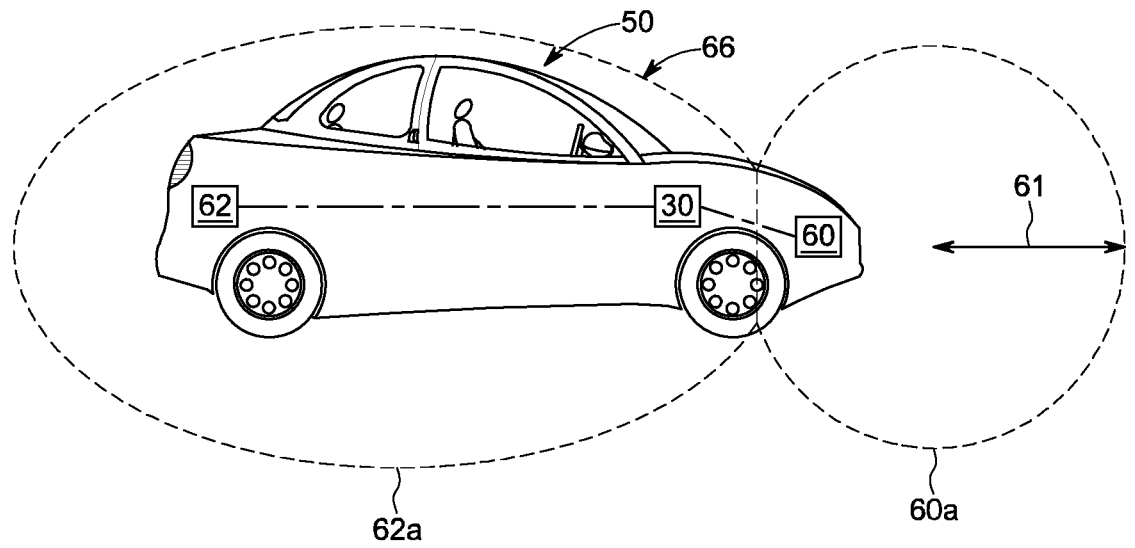
FIG. 2 shows a schematic view of a vehicle.

FIG. 2 shows a schematic view of a vehicle 50. The vehicle 50 comprises a control unit 30 (as described in FIG. 1), e.g. an engine control unit, and a plurality of receivers 60, 62, e.g. BLE receivers 60, 62.

In an example, each receiver 60, 62 of the plurality of receivers 60, 62 comprises a sub-coverage area 60a, 62a, so that the transmitter connected to one receiver 60, 62 of the plurality of receivers 60, 62 is detectable in every sub-coverage area 60a, 62a by an associated receiver 60, 62. A sub-coverage area may be formed by a coverage radius 61 of a receiver 60, 62. For example, a maximum distance at which the receiver 60, 62 can be connected to the transmitter may define the coverage radius 61, and thus the sub-coverage area of each receiver 60, 62. The coverage radius 61 may differ in relation to different spatial directions. After establishing a connection to a receiver 60, 62 the transmitter may be detected in the sub-coverage area 60a, 62a of this receiver 60, 62, respectively. By using the same identification information to establish further connections between the transmitter and each receiver 60, 62 of the plurality of receivers 60, 62, the transmitter may be detected in every associated sub-coverage area 60a, 62a of each receiver 60, 62. Thus, a coverage area 66 may be increased, e.g. a contiguous coverage area 66 may be formed by the associated sub-coverage areas 60a, 62a of the plurality of receivers 60, 62.

In an example, the sub-coverage areas 60a, 62a of at least two receivers 60, 62 of the plurality of receivers 60, 62 partially overlap with each other forming a coverage area 66, so that the transmitter connected to one receiver 60, 62 of the plurality of receivers 60, 62 is detectable in the coverage area by every associated receiver 60, 62 of the plurality of receivers 60, 62. For example, a vehicle 50 may comprise two receivers 60, 62 at opposite parts of the vehicle 50, e.g. front (receiver 60) and rear (receiver 62). Each receiver 60, 62 with its associated sub-coverage area 60a and 62a may cover a partial area around the vehicle 50, in which the transmitter, e.g. a smart device for keyless vehicle access, may be detected. Thus, a continuous coverage area 66 may be formed by the two sub-coverage area 60a, 62a.

In an example, the coverage area 66 encloses the vehicle 50, so that a transmitter in the vicinity of the vehicle 50 is detectable by at least one receiver 60, 62 of the plurality of receivers 60, 62. For example, a sub-coverage area 60a of the first receiver 60 may be partially shielded by a radiopaque structure, e.g. an engine of the vehicle 50, such that multiple receivers 60, 62 may be required to form a coverage area 66 that encloses the vehicle 50. Therefore, to form a coverage area 66, that completely surrounds the vehicle 50, multiple receivers 60, 62 may be required. By assigning the same identification information to both receivers 60, 62, only one connection process may be required to form the coverage area 66, that completely surrounds the vehicle 50, leading to a reduced time and/or resource consumption and an improved user experience.

For example, the vehicle 50 may comprise multiple BLE chips 60, 62. These multiple BLE chips 60, 62 may be used to cover a contiguous area 66, so that a detection of a transmitter may be improved with the multiple BLE chips 60, 62, which cover different areas around the vehicle 50. Each BLE chip 60, 62 can be assigned an TRK (identity resolving key) and a static random address. Both may be needed to establish a Bluetooth connection, e.g. by pairing process.

The connection process between the transmitter and the BLE chips 60, 62 of the vehicle 50 may be done by using one BLE chip 60, 62. However, the other BLE chips 60, 62 shall/may be paired as well (without a further initial linkage) in order to be used by/enabled for a user. This may be possible in case the multiple BLE chips 60, 62 have the same BLE identify address and identity resolving key (IRK). This may be possible when the static random address is used as an identity address. To do this, just one random static address and just one TRK may be generated in the main engine control unit 30 (ECU) in the vehicle 50 and may be sent to all BLE chips 60, 62. Thus, the random static address and the TRK are identical for each BLE chip 60, 62. These addresses may be used by all BLE chips 60, 62 in the vehicle 50. This means if a smart device is paired with one BLE chip 60, 62, only the connection data (pairing information) shall be sent to the other BLE chips 60, 62, e.g. by the ECU 30, so that all of them become paired with the smart device. Thus, for establishing a connection with each BLE chip 60, 62 of the vehicle 50 only one connection (e.g. pairing) process between the transmitter and one BLE chip 60, 62 is required. All other BLE chips 60, 62 can then be connected to the transmitter without a further initial linkage.

More details and aspects are mentioned in connection with the embodiments described above or below. The example shown in FIG. 2 may comprise one or more optional additional features corresponding to one or more aspects mentioned in connection with the proposed concept or one or more examples described above (FIG. 1) and/or below (e.g. FIG. 3).

Figure 3:
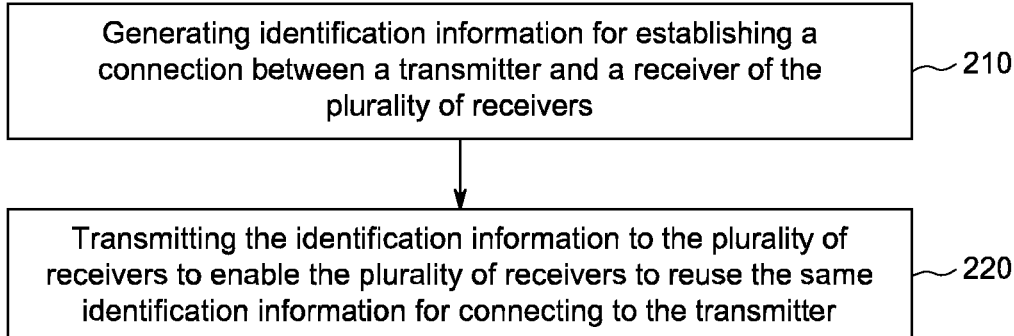
FIG. 3 shows an example of a method.

FIG. 3 shows an example of a method 200 for controlling connection establishment between a transmitter and a plurality of receivers 60, 62. The method 200 comprises generating 210 identification information for establishing a connection between a transmitter and a receiver 60, 62 of the plurality of receivers 60, 62. Further, the method 200 comprises transmitting 220 the identification information to the plurality of receivers 60, 62 to enable the plurality of receivers 60, 62 to reuse the same identification information for connecting to the transmitter. For example, generating 210 and transmitting 220 the identification information may be performed by a control unit described in FIG. 1, which may be embedded in a vehicle as described in FIG. 2. The identification information may comprise e.g. a private identity address and an identity resolving key, which may be required for establishing a Bluetooth connection between a transmitter and a receiver. By transmitting 220 the identification information to a plurality of receivers 60, 62, each receiver may be assigned the same identification information, e.g. the same private identity address and the same identity resolving key. Thus, when a connection between the first receiver and the transmitter is established by an initial linkage (connection process), e.g. by a pairing process, the transmitter can be automatically connected to each receiver of the plurality of receivers 60, 62 without a further initial linkage.

For example, a vehicle may comprise multiple BLE chips. A user may have a smart device for keyless access to the vehicle using BLE. To enable the functionality of the smart device for the user, the smart device needs to establish a connection with at least one BLE chip. To establish a connection between the smart device and a BLE chip, the smart device may need to be paired with the BLE chip. To provide an improved user experience the smart device may be required to connect with each of the vehicle's multiple BLE chips. Transmitting the (same) identification information to each BLE chip may enable the smart device to establish a connection to each of the vehicle's multiple BLE chips by performing only one initial linkage to one BLE chip of the vehicle. This may be achieved by generating connection information, e.g. pairing information specific for the identification information, enabling each of the vehicle's multiple BLE chips to connect with smart device using the connection information without further required initial linkage.

For example, a user may approach a vehicle to get into it. The user may carry a smart device for keyless vehicle access and the vehicle may comprise multiple BLE chips. When the smart device arrives within the sub-coverage area of a vehicle's BLE chip, the smart device and the BLE chip may perform a connection process, e.g. a pairing process, to establish a connection between them. So, the smart device may reconnect to the BLE chip any time without a new connection process. Information about the connection process can be transmitted to other vehicle's BLE chips, such that the smart device may be connected automatically to each vehicle's BLE chip when it comes into the associated sub-coverage area of the BLE chip. Thus, only one connection process may be required to connect/reconnect the smart device with each vehicle's BLE chip.

More details and aspects are mentioned in connection with the embodiments described above. The example shown in FIG. 3 may comprise one or more optional additional features corresponding to one or more aspects mentioned in connection with the proposed concept or one or more examples described above (e.g. FIG. 1-2).

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

If some aspects have been described in relation to a device or system, these aspects should also be understood as a description of the corresponding method and vice versa. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

LIST OF REFERENCE SIGNS 30 control unit
32 interface
34 processing circuitry
50 vehicle
60 receiver
60a sub-coverage area
61 coverage radius
62 receiver
62a sub-coverage area
66 coverage area
200 method for controlling connection establishment
210 generating identification information
220 transmitting identification information

What is claimed is:

1. A control unit for controlling connection establishment between a transmitter and a plurality of receivers, the control unit comprising:
an interface configured to communicate with the plurality of receivers; and
processing circuitry configured to
control the interface,
generate identification information for establishing a connection between the transmitter and a receiver of the plurality of receivers, and
transmit the identification information to the plurality of receivers, the identification information configured to enable the plurality of receivers to reuse the identification information for connecting to the transmitter.

2. The control unit according to claim 1, wherein the processing circuitry is further configured to:
receive connection information from a first receiver of the plurality of receivers using the interface, wherein the connection information comprises data about an established connection between the first receiver and the transmitter; and
transmit the connection information to a second receiver of the plurality of receivers using the interface, wherein the connection information is used to connect the transmitter with the second receiver of the plurality of receivers.

3. The control unit according to claim 2, wherein the identification information comprises a private identity address.

4. The control unit according to claim 3, wherein the identification information further comprises an identity resolving key.

5. The control unit according to claim 2, wherein the identification information comprises an identity resolving key.

6. The control unit according to claim 1, wherein the identification information comprises a private identity address.

7. The control unit according to claim 6, wherein the identification information further comprises an identity resolving key.

8. The control unit according to claim 1, wherein the identification information comprises an identity resolving key.

9. The control unit according to claim 1, wherein the processing circuitry is further configured to generate the identification information for a Bluetooth Low Energy receiver.

10. A vehicle comprising:
a control unit according to claim 1; and
the plurality of receivers.

11. The vehicle according to claim 10, wherein:
each receiver of the plurality of receivers comprises a sub-coverage area, such that the transmitter connected to one receiver of the plurality of receivers is detectable in every sub-coverage area by an associated receiver.

12. The vehicle according to claim 11, wherein:
the sub-coverage areas of at least two receivers of the plurality of receivers partially overlap with each other forming a coverage area, such that the transmitter connected to one receiver of the plurality of receivers is detectable in the coverage area by every receiver of the associated at least two receivers.

13. The vehicle according to claim 12, wherein a coverage area of at least two of the plurality of receivers includes the vehicle such that a transmitter in the vicinity of the vehicle is detectable by at least one receiver of the plurality of receivers.

14. The vehicle according to claim 10, wherein:
sub-coverage areas of at least two receivers of the plurality of receivers partially overlap with each other forming a coverage area, and wherein the transmitter connected to one receiver of the plurality of receivers is detectable in the coverage area by every receiver of the associated at least two receivers.

15. The vehicle according to claim 14, wherein the coverage area includes the vehicle such that a transmitter in the vicinity of the vehicle is detectable by at least one receiver of the plurality of receivers.

16. The vehicle according to claim 10, wherein the processing circuitry of the control unit is further configured to:
receive connection information from a first receiver of the plurality of receivers using the interface, wherein the connection information comprises data about an established connection between the first receiver and the transmitter; and
transmit the connection information to a second receiver of the plurality of receivers using the interface, wherein the connection information is used to connect the transmitter with the second receiver of the plurality of receivers.

17. A method for controlling connection establishment between a transmitter and a plurality of receivers, the method comprising:
generating identification information for establishing a connection between a transmitter and a receiver of the plurality of receivers; and
transmitting the identification information to the plurality of receivers wherein the identification is configured to enable the plurality of receivers to reuse the identification information for connecting to the transmitter.

18. A non-transitory computer-readable medium for controlling connection establishment between a transmitter and a plurality of receivers, wherein the computer-readable medium comprises instructions which, when executed on a computer, a processor or programmable hardware component, carry out the method as claimed in claim 17.

\* \* \* \* \*